US010209757B2

United States Patent
Battle et al.

(10) Patent No.: US 10,209,757 B2
(45) Date of Patent: *Feb. 19, 2019

(54) REDUCING POWER CONSUMPTION IN A MULTI-SLICE COMPUTER PROCESSOR

(71) Applicant: International Business Machines Corporation, Armonk, NY (US)

(72) Inventors: Steven J. Battle, Austin, TX (US); Owen Chiang, Austin, TX (US); Sam G. Chu, Round Rock, TX (US); Saiful Islam, Autsin, TX (US); Dung Q. Nguyen, Austin, TX (US); David R. Terry, Austin, TX (US); Eula A. Tolentino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,063

(22) Filed: Nov. 2, 2017

(65) Prior Publication Data
US 2018/0088653 A1    Mar. 29, 2018

Related U.S. Application Data

(63) Continuation of application No. 15/045,419, filed on Feb. 17, 2016, now Pat. No. 9,870,045, which is a
(Continued)

(51) Int. Cl.
*G06F 1/26* (2006.01)
*G06F 1/32* (2006.01)
(Continued)

(52) U.S. Cl.
CPC ............... *G06F 1/32* (2013.01); *G06F 1/329* (2013.01); *G06F 1/3243* (2013.01);
(Continued)

(58) Field of Classification Search
CPC .......... G06F 1/32; G06F 1/3243; G06F 1/329; G06F 9/3855; G06F 9/30101;
(Continued)

(56) References Cited

U.S. PATENT DOCUMENTS 5,651,125 A    7/1997 Witt et al.
5,930,521 A    7/1999 Tien et al.
(Continued)

OTHER PUBLICATIONS

IBM, "On-Demand Scratch Register Renaming in an Out of Order Microprocessor", An IP.com Prior Art Database Technical Disclosure (online), dated Feb. 4, 2008, 3 pages, URL: http://ip.com/IPCOM/000167242.
(Continued)

*Primary Examiner* — Xuxing Chen
(74) *Attorney, Agent, or Firm* — Joseph D. Downing; Nathan M. Rau; Kennedy Lenart Spraggins LLP

(57) ABSTRACT

Reducing power consumption in a multi-slice computer processor that includes a re-order buffer and an architected register file, including: designating an entry in the re-order buffer as being invalid and unwritten; assigning a pending instruction to the entry in the re-order buffer; responsive to assigning the pending instruction to the entry in the re-order buffer, designating the entry as being valid; writing data generated by executing the pending instruction into the re-order buffer; and responsive to writing data generated by executing the pending instruction into the re-order buffer, designating the entry as being written.

7 Claims, 7 Drawing Sheets

Related U.S. Application Data continuation of application No. 14/970,101, filed on Dec. 15, 2015, now Pat. No. 9,870,039.

(51) Int. Cl.
  *G06F 9/38* (2018.01)
  *G06F 9/30* (2018.01)
  *G06F 12/0808* (2016.01)
  *G06F 9/54* (2006.01)

(52) U.S. Cl.
  CPC ........ *G06F 9/30101* (2013.01); *G06F 9/3855* (2013.01); *G06F 9/3836* (2013.01); *G06F 9/3857* (2013.01); *G06F 9/544* (2013.01); *G06F 12/0808* (2013.01)

(58) Field of Classification Search
  CPC ...... G06F 9/3836; G06F 9/544; G06F 9/3857; G06F 12/0808; H05K 999/99
  See application file for complete search history.

(56) References Cited

U.S. PATENT DOCUMENTS

| | | |
|---|---|---|
| 5,946,468 A | 8/1999 | Witt et al. |
| 6,405,303 B1 | 6/2002 | Miller et al. |
| 6,425,072 B1 | 7/2002 | Meier et al. |
| 2008/0229077 A1 | 9/2008 | Sathaye |
| 2009/0055633 A1 | 2/2009 | Sathaye |
| 2016/0357554 A1 | 12/2016 | Caulfield et al. |
| 2017/0168539 A1 | 6/2017 | Battle et al. |
| 2017/0168544 A1 | 6/2017 | Battle et al. |

OTHER PUBLICATIONS

Anonymous, "Method for a compressing reorder buffer", An IP.com Prior Art Database Technical Disclosure (online), printed Nov. 10, 2015, 6 pages, URL: http://ip.com/IPCOM/000137917.

Battle et al., *Reducing Power Consumption in a Multi-Slice Computer Processor*, IBM, U.S. Appl. No. 15/802,734, filed Nov. 3, 2017, 30 pages.

Appendix P; List of IBM Patent or Applications Treated as Related, Dec. 5, 2017, 2 pages.

REDUCING POWER CONSUMPTION IN A MULTI-SLICE COMPUTER PROCESSOR

CROSS-REFERENCE TO RELATED APPLICATION

This application is a continuation application of and claims priority from U.S. patent application Ser. No. 15/045,419, filed on Feb. 17, 2016 and U.S. patent application Ser. No. 14/970,101, filed on Dec. 15, 2015.

BACKGROUND

Field of the Invention

The field of the invention is data processing, or, more specifically, methods, apparatus, and products for reducing power consumption in a multi-slice computer processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include one or more microprocessors. In current microprocessor design, the re-order buffer ('ROB') or the architected register file ('ARF') contain operand data that an instruction would need to access before it can be executed. In this ROB/ARF design, the ARF contains completed data (architected data), while the ROB contains in-flight data (i.e. data for instructions that have not been completed). In current design, the dispatching or issuing instructions will read the ROB and the ARF for its operands regardless the ROB/ARF data is available or not. If the data from the ROB/ARF is available, then the instruction can be executed. However, if the data from the ROB/ARF is not available because its producer has not written back the data, then the data is stale and not usable by the dispatching/issuing instruction. Reading stale data from the ROB/ARF Register Files consumes and wastes power.

SUMMARY

Methods, processors, and systems for reducing power consumption in a multi-slice computer processor that includes a re-order buffer and an architected register file, including: designating an entry in the re-order buffer as being invalid and unwritten; assigning a pending instruction to the entry in the re-order buffer; responsive to assigning the pending instruction to the entry in the re-order buffer, designating the entry as being valid; writing data generated by executing the pending instruction into the re-order buffer; and responsive to writing data generated by executing the pending instruction into the re-order buffer, designating the entry as being written.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
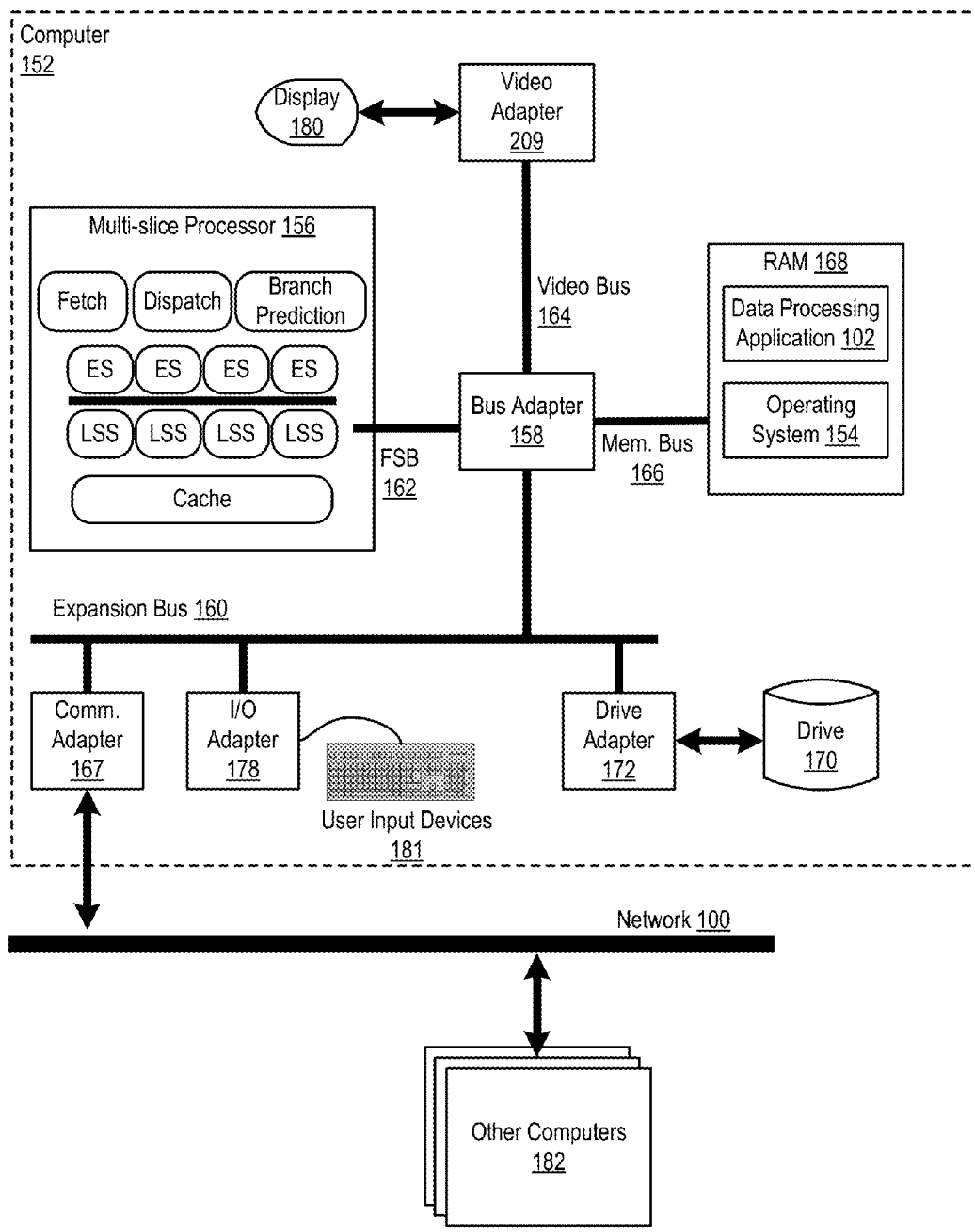
FIG. 1 sets forth a block diagram of an example system configured for reducing power consumption in a multi-slice computer processor according to embodiments of the present disclosure.

Example methods, apparatus, and products for reducing power consumption in a multi-slice computer processor in accordance with the present disclosure are described with reference to the accompanying drawings, beginning with FIG. 1. FIG. 1 sets forth a block diagram of an example system configured for reducing power consumption in a multi-slice computer processor according to embodiments of the present disclosure. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for reducing power consumption in a multi-slice computer processor according to embodiments of the present disclosure include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for reducing power consumption in a multi-slice computer processor according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for reducing power consumption in a multi-slice computer processor according to embodiments of the present disclosure include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
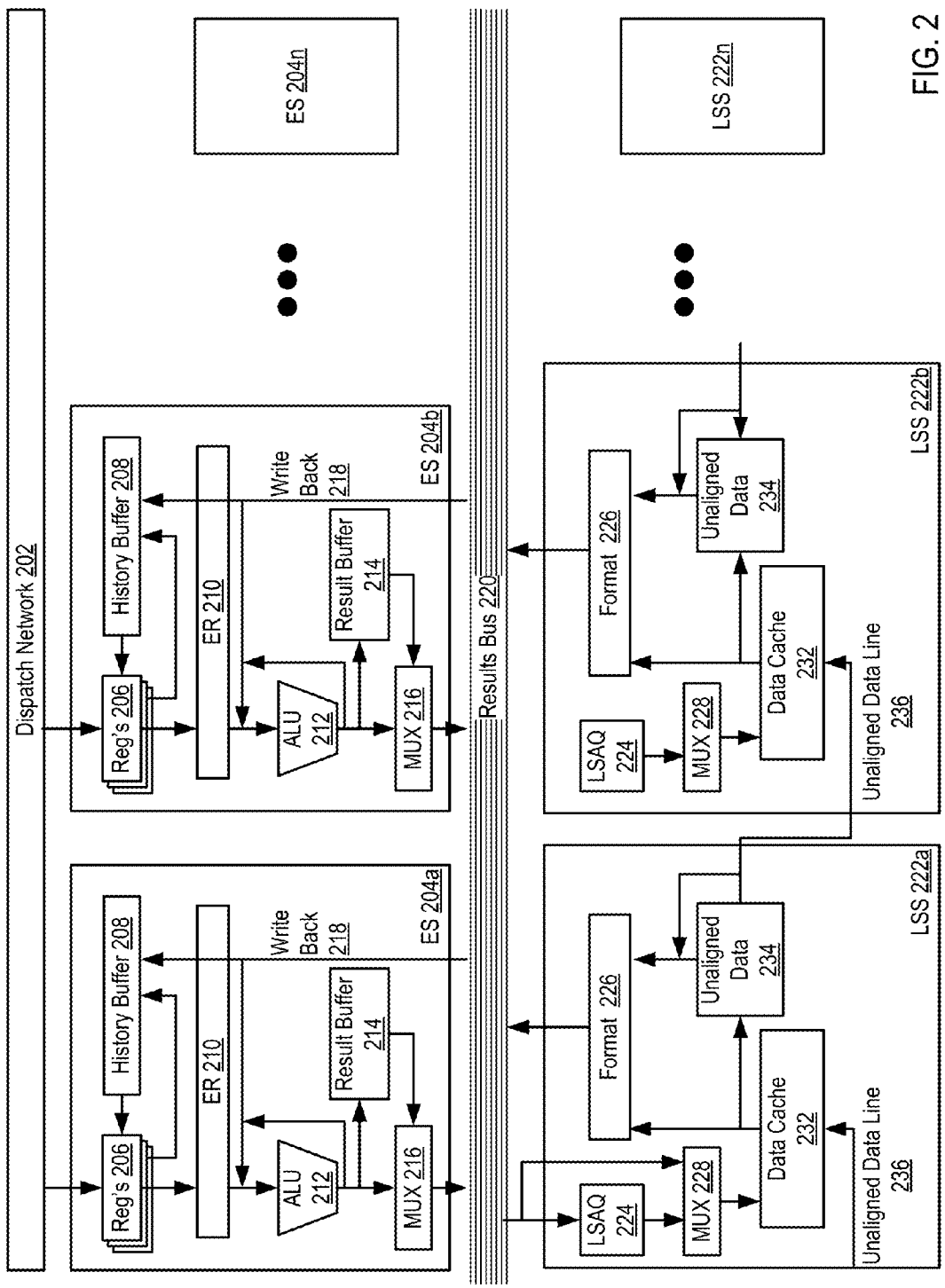
FIG. 2 sets forth a block diagram of a portion of a multi-slice processor according to embodiments of the present disclosure.

For further explanation, FIG. 2 sets forth a block diagram of a portion of a multi-slice processor, also referred to as a multi-slice computer processor, according to embodiments of the present disclosure. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The multi-slice processor in the example of FIG. 2 may be configured for reducing power consumption according to embodiments of the present disclosure by: designating an entry in the re-order buffer as being invalid and unwritten; assigning a pending instruction to the entry in the re-order buffer; responsive to assigning the pending instruction to the entry in the re-order buffer, designating the entry as being valid; writing data generated by executing the pending instruction into the re-order buffer; and responsive to writing data generated by executing the pending instruction into the re-order buffer, designating the entry as being written, as will be described in greater detail below. The multi-slice processor in the example of FIG. 2 may implement an architected register file using the general purpose registers (206), as each register may be used to hold a single entry in the architected register file. The multi-slice processor in the example of FIG. 2 may also implement a re-order buffer using the general purpose registers (206), as each register may be used to hold a single entry in the re-order buffer.

In some embodiments, the multi-slice processor in the example of FIG. 2 may be further configured for reducing power consumption according to embodiments of the present disclosure by: receiving a request to read the entry in the re-order buffer; determining whether the entry in the re-order buffer is designated as being valid and written; responsive to determining that the entry in the re-order buffer is designated as being valid and written, servicing the request to read the entry in the re-order buffer; and responsive to determining that the entry in the re-order buffer is not designated as being valid and written, dismissing the request to read the entry in the re-order buffer, as will be described in greater detail below.

In some embodiments, the multi-slice processor in the example of FIG. 2 may be further configured for reducing power consumption according to embodiments of the present disclosure by: receiving a request to read an entry in the architected register file, wherein the entry in the architected register file is identified in the entry of the re-order buffer as containing an operand for the pending instruction that is contained in the entry of the re-order buffer; determining whether the entry in the re-order buffer is designated as being valid; responsive to determining that the entry in the re-order buffer is designated as being valid, dismissing the request to read the entry in the architected register file; and responsive to determining that the entry in the re-order buffer is not designated as being valid, servicing the request to read the entry in the architected register file, as will be described in greater detail below.

In some embodiments, the multi-slice processor in the example of FIG. 2 may be further configured for reducing power consumption according to embodiments of the present disclosure by detecting that the pending instruction has executed and responsive to detecting that the pending instruction has executed, moving the entry in the re-order buffer to the architected register file, as will be described in greater detail below.

In some embodiments, the multi-slice processor in the example of FIG. 2 may be further configured for reducing power consumption according to embodiments of the present disclosure by, responsive to moving the entry in the re-order buffer to the architected register file designating the entry in the re-order buffer as being invalid and unwritten, as will be described in greater detail below.

Figure 3:
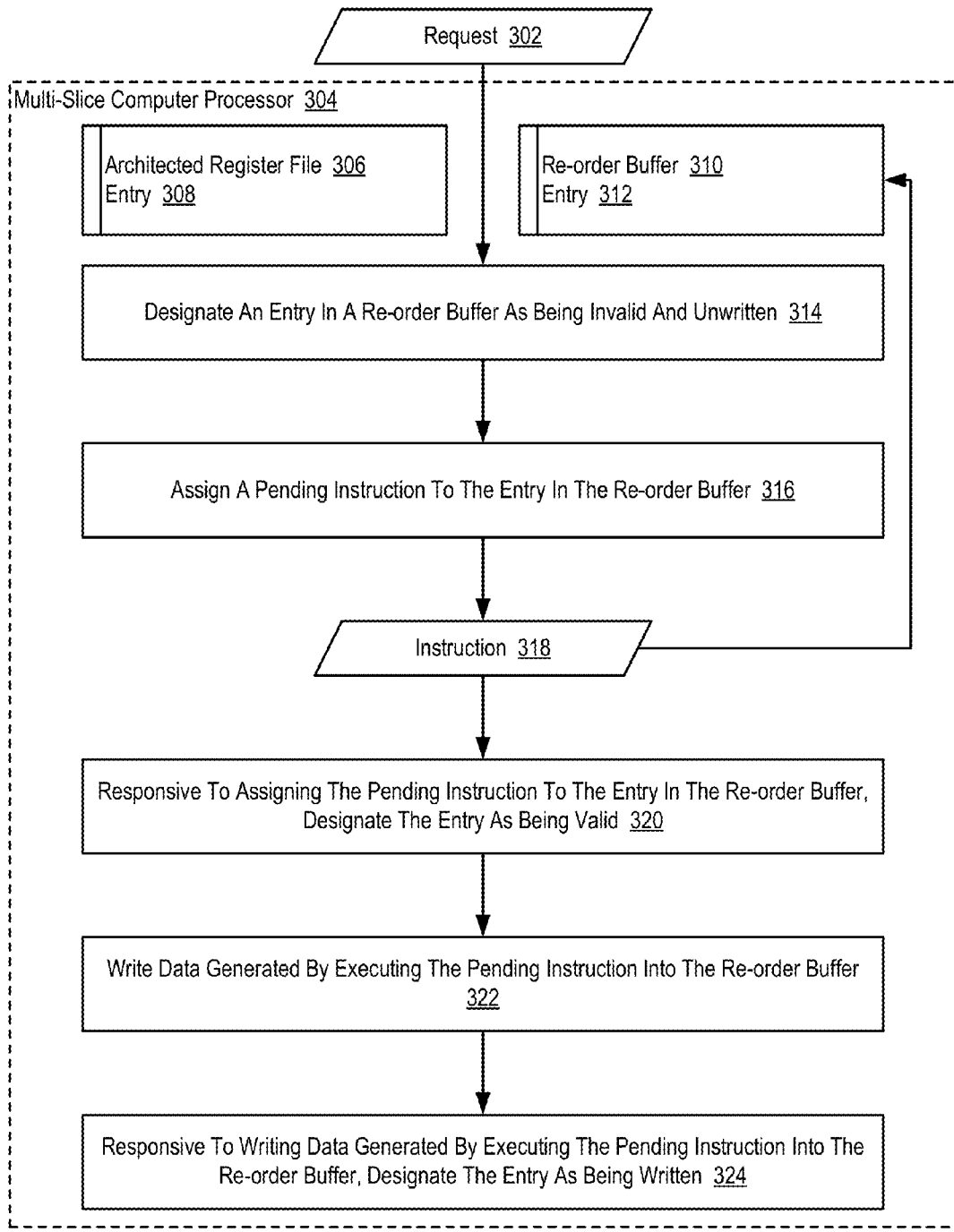
FIG. 3 sets forth a flow chart illustrating an example method for reducing power consumption in a multi-slice computer processor according to embodiments of the present disclosure.

For further explanation, FIG. 3 sets forth a flow chart illustrating an example method for reducing power consumption in a multi-slice computer processor (304) according to embodiments of the present disclosure. The multi-slice computer processor (304) depicted in FIG. 3 includes a re-order buffer (310) and an architected register file (306). The re-order buffer (310) depicted in FIG. 3 may be embodied, for example, as a hardware buffer utilized to store the results of uncommitted instructions. Each entry in the re-order buffer (310) can include information such as an instruction type such as jump, store to memory, store to register, a destination that identifies as a memory address or register number that results of the instruction should be written to, the result generated by executing the instruction, as well as validity bit and a written bit as will be described in greater detail below. The architected register file (306) depicted in FIG. 3 may be embodied, for example, as a hardware buffer utilized to store the results of committed instructions. Each entry in the architected register file (306) can include information such as an instruction type such as jump, store to memory, store to register, as well as the result generated by executing the instruction.

The example method depicted in FIG. 3 includes designating (314) an entry (312) in the re-order buffer (310) as being invalid and unwritten. The multi-slice computer processor (304) may designate (314) the entry (312) in the re-order buffer (310) as being invalid and unwritten to indicate that the entry (312) in the re-order buffer (310) is available to accept a pending instruction. The multi-slice computer processor (304) may therefore designate (314) the entry (312) in the re-order buffer (310) as being invalid and unwritten, for example, when the multi-slice computer processor (304) is first powered on or when an instruction that was previously contained in the entry (312) has been executed and committed to the architected register file (306). Each entry (312) in the re-order buffer (310) may include a valid bit and an unwritten bit such that designating (314) the entry (312) in the re-order buffer (310) as being invalid and unwritten may be carried out by setting the valid bit and the unwritten bit to the appropriate value. For example, designating (314) the entry (312) in the re-order buffer (310) as being invalid and unwritten may be carried out by setting the valid bit and the unwritten bit to values of 0.

The example method depicted in FIG. 3 also includes assigning (316) a pending instruction (318) to the entry (312) in the re-order buffer (310). The pending instruction (318) may be embodied, for example, as a speculative instruction that may or may not ultimately issue. For example, when a branch instruction is encountered, the first instruction in each branch may be speculatively loaded into the re-order buffer (310) by assigning the first instruction in each branch to a distinct entry in the re-order buffer (310). Assigning (316) the pending instruction (318) to the entry (312) in the re-order buffer (310) may be carried out, for example, by writing an identifier for the pending instruction into the re-order buffer (310) entry (312), by writing an identifier for an entry in the architected register file (306) where the re-order buffer (310) entry (312) will be moved to in order to commit the instruction, and so on.

The example method depicted in FIG. 3 also includes, responsive to assigning (316) the pending instruction (318) to the entry (312) in the re-order buffer (310), designating (320) the entry (312) as being valid. Designating (320) the entry (312) as being valid may be carried out, for example, by setting the valid bit to an appropriate value that indicates that the entry (312) is being used to store the results for a pending instruction that has not yet been committed to the architected register file (306). For example, designating (320) the entry (312) as being valid may be carried out by setting the valid bit to a value of 1. Readers will appreciate that although assigning (316) the pending instruction (318) to the entry (312) in the re-order buffer (310) causes the entry (312) to be designated (320) as being valid, assigning (316) the pending instruction (318) to the entry (312) in the re-order buffer (310) has no impact on the designation of the entry (312) as being unwritten.

The example method depicted in FIG. 3 also includes writing (322) data generated by executing the pending instruction into the entry (312) in the re-order buffer (310). Writing (322) data generated by executing the pending instruction into the entry (312) in the re-order buffer (310) may be carried out, for example, by monitoring a results bus that is attached to execution logic. The results bus may be monitored for date that is associated with an instruction identifier (e.g., an ITAG) that matches the instruction identifier of the pending instruction. In such an example, when the data that is generated by executing the pending instruction is retrieved, the date may be written (322) into the entry (312) in the re-order buffer (310).

The example method depicted in FIG. 3 also includes, responsive to writing (322) data generated by executing the pending instruction into the entry (312) in the re-order buffer (310), designating (324) the entry (312) as being written. Designating (324) the entry (312) as being written may be carried out, for example, by setting the written bit to an appropriate value that indicates that the resultant data that was generated by executing the pending instruction is stored in the re-order buffer (310) entry (312). For example, designating (324) the entry (312) as being written may be carried out by setting the written bit to a value of 1. Readers will appreciate that although writing (322) data generated by executing the pending instruction into the entry (312) in the re-order buffer (310) causes the entry (312) to be designated (324) as being written, writing (322) data generated by executing the pending instruction into the entry (312) in the re-order buffer (310) has no impact on the designation of the entry (312) as being valid.

Figure 4:
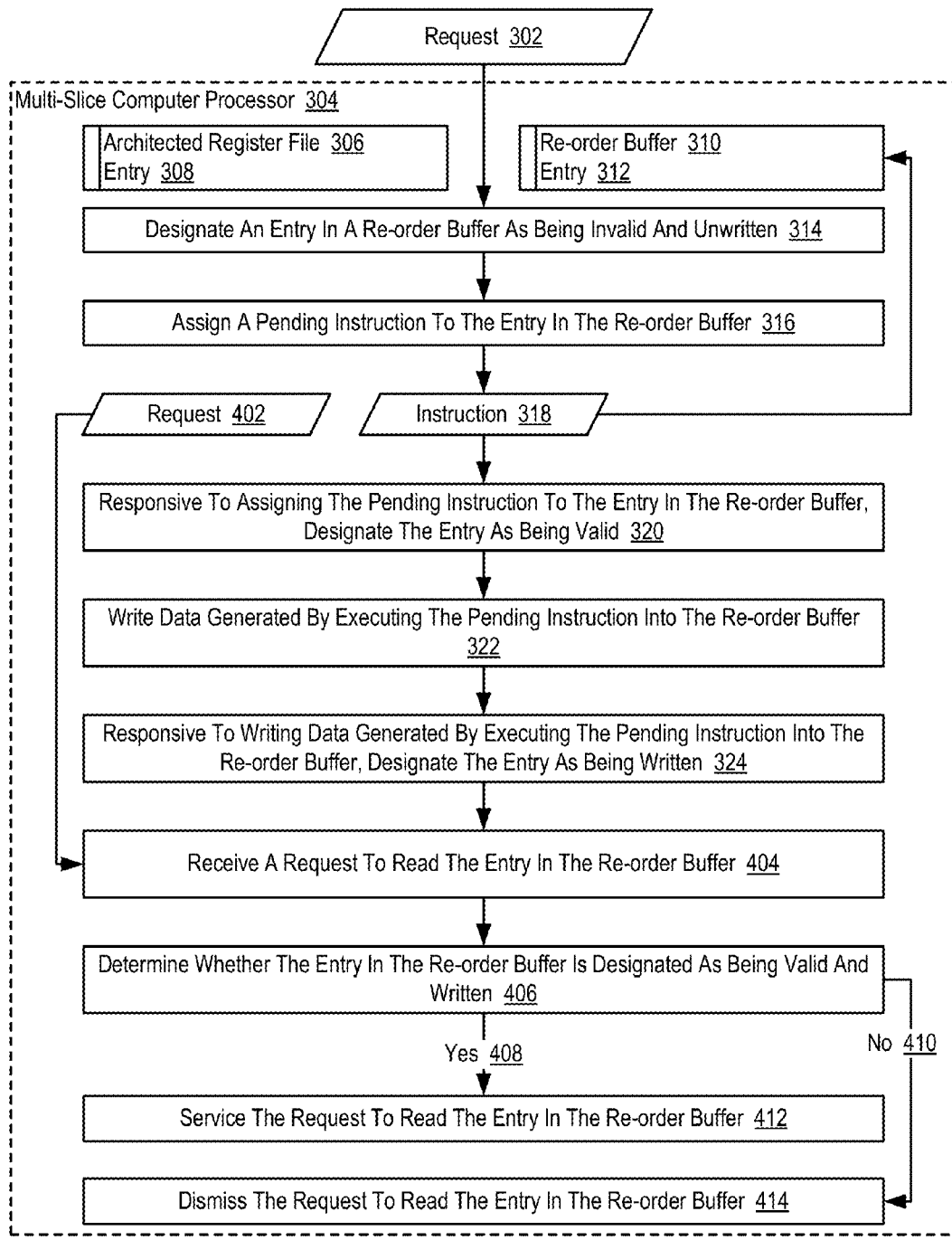
FIG. 4 sets forth a flow chart illustrating an additional example method for reducing power consumption in a multi-slice computer processor according to embodiments of the present disclosure.

For further explanation, FIG. 4 sets forth a flow chart illustrating an additional example method for reducing power consumption in a multi-slice computer processor (304) according to embodiments of the present disclosure. The example method depicted in FIG. 4 is similar to the example method depicted in FIG. 3, as the example method depicted in FIG. 4 also includes designating (314) an entry (312) in the re-order buffer (310) as being invalid and unwritten, assigning (316) a pending instruction (318) to the entry (312) in the re-order buffer (310), designating (320) the entry (312) as being valid, writing (322) data generated by executing the pending instruction into the entry (312) in the re-order buffer (310), and designating (324) the entry (312) as being written.

The example method depicted in FIG. 4 also includes receiving (404) a request (402) to read the entry (312) in the re-order buffer (310). In the example method depicted in FIG. 4, the request (402) to read the entry (312) in the re-order buffer (310) may be received (404) as part of an attempt to commit the instruction by moving the instruction and its results into the architected register file (306). In such an example, if the request (402) to read the entry (312) in the re-order buffer (310) is serviced, information such as an instruction code that represents the type of instruction (e.g., add, multiply) may be read, and resultant data generated by executing the instruction may also be read, for subsequent insertion into the architected register file (306).

The example method depicted in FIG. 4 also includes determining (406) whether the entry (312) in the re-order buffer (310) is designated as being valid and written. Determining (406) whether the entry (312) in the re-order buffer (310) is designated as being valid and written may be carried out, for example, by inspecting the values contained in one or more valid bits and one or more written bits that are stored in the entry (312) itself. In such an example, if the valid bit indicates that the entry is not valid, the multi-slice computer processor (304) determines that the re-order buffer (310) is not (410) designated as being valid and written. Likewise, if the valid bit indicates that the entry is valid but the written bit indicates that resultant data generated by executing the pending instruction has not been written to the re-order buffer (310), the multi-slice computer processor (304) determines that the re-order buffer (310) is not (410) designated as being valid and written. The multi-slice computer processor (304) will only affirmatively (408) determine that the entry (312) in the re-order buffer (310) is designated as being valid and written when the valid bit indicates that the entry (312) is valid (and therefore currently holding a pending instruction) and the written bit indicates that resultant data generated by executing the pending instruction has been written to the re-order buffer (310).

The example method depicted in FIG. 4 also includes servicing (412) the request (402) to read the entry (312) in the re-order buffer (310). In the example method depicted in FIG. 4, servicing (412) the request (402) to read the entry (312) in the re-order buffer (310) may be carried out in response to affirmatively (408) determining that the entry (312) in the re-order buffer (310) is designated as being valid and written. Servicing (412) the request (402) to read the entry (312) in the re-order buffer (310) may be carried out by allowing the entire contents of the entry (312) to be read so that the instruction can be committed by writing the instruction and the resultant data generated by executing the instruction into the architected register file (306).

The example method depicted in FIG. 4 also includes dismissing (414) the request (402) to read the entry (312) in the re-order buffer (310). In the example method depicted in FIG. 4, dismissing (414) the request (402) to read the entry (312) in the re-order buffer (310) is carried out in response to determining that the entry (312) in the re-order buffer (310) is not (410) designated as being valid and written. The multi-slice computer processor (304) may dismiss (414) the request (402) to read the entry (312) in the re-order buffer (310) by simply discarding the request (402) and moving on to the next request. In such a way, when the entry (312) in the re-order buffer (310) does not contain a pending instruction, or contains a pending instruction whose resultant data that is generated by executing the pending instruction has not been written to the re-order buffer (310), the multi-slice processor (304) may reduce its power consumption by only reading two bits (the valid bit and the written bit) before determining that the re-order buffer (310) entry (312) does not include an instruction that has been fully executed with results returned, rather than reading the entire entry (312) only to determine that the re-order buffer (310) entry (312) does not include an instruction that has been fully executed with results returned.

Figure 5:
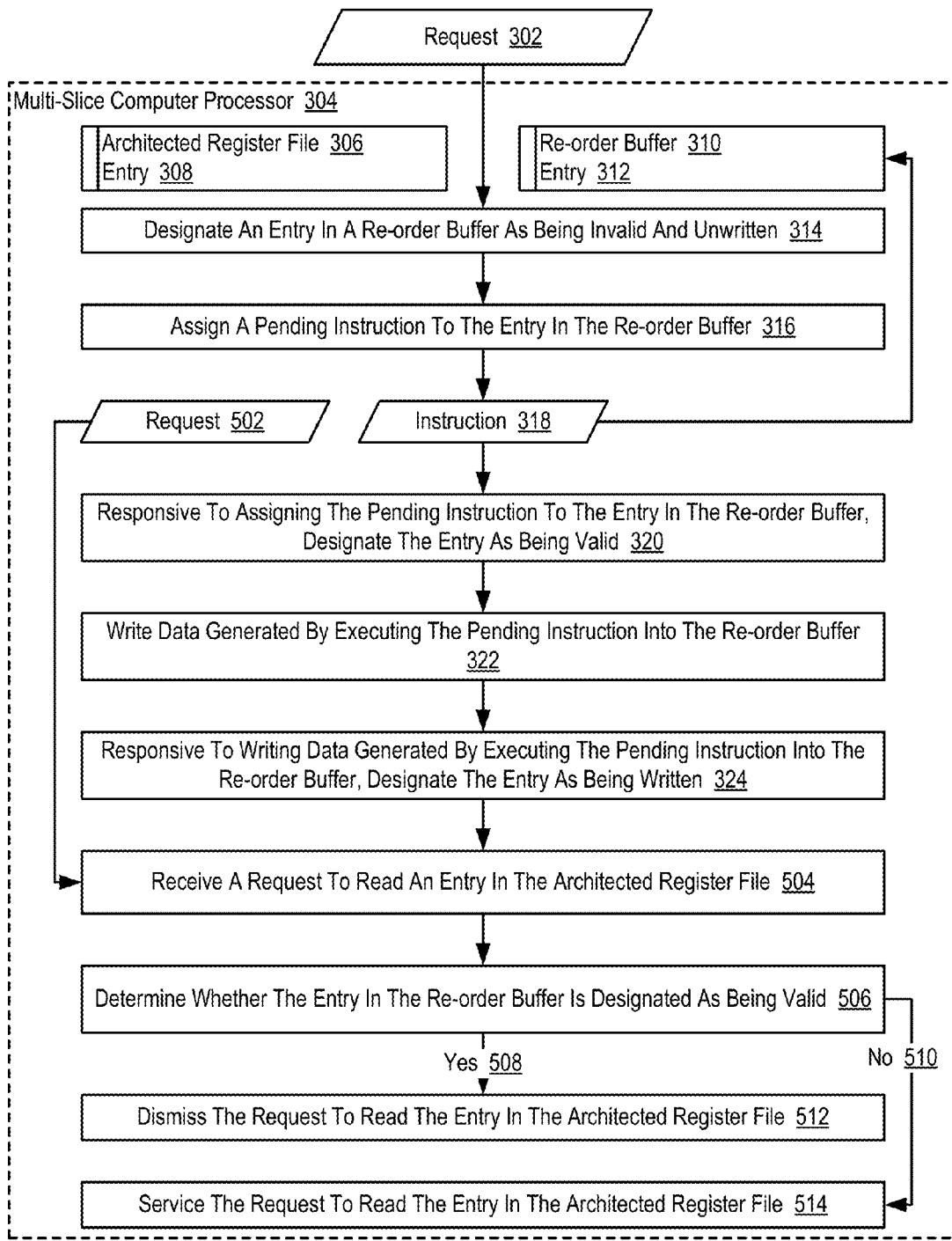
FIG. 5 sets forth a flow chart illustrating an additional example method for reducing power consumption in a multi-slice computer processor according to embodiments of the present disclosure.

For further explanation, FIG. 5 sets forth a flow chart illustrating an additional example method for reducing power consumption in a multi-slice computer processor (304) according to embodiments of the present disclosure. The example method depicted in FIG. 5 is similar to the example method depicted in FIG. 3, as the example method depicted in FIG. 5 also includes designating (314) an entry (312) in the re-order buffer (310) as being invalid and unwritten, assigning (316) a pending instruction (318) to the entry (312) in the re-order buffer (310), designating (320) the entry (312) as being valid, writing (322) data generated by executing the pending instruction into the entry (312) in the re-order buffer (310), and designating (324) the entry (312) as being written.

The example method depicted in FIG. 5 also includes receiving (504) a request (502) to read an entry (308) in the architected register file (306). The request (502) to read the entry (308) in the architected register file (306) may be generated, for example, as part of a process to move the entry (308) in the architected register file (306) to a history buffer. The entry (308) in the architected register file (306) may be moved to a history buffer because the pending instruction in the re-order buffer (310) entry (312) has been executed and the pending instruction is being committed and is replacing the entry (308) in the architected register file (306).

The example method depicted in FIG. 5 also includes determining (506) whether the entry (312) in the re-order buffer (310) is designated as being valid. Determining (506) whether the entry (312) in the re-order buffer (310) is designated as being valid may be carried out, for example, by inspecting the value contained in a valid bit that is stored in the entry itself. In such an example, the valid bit may be set to a value indicating that the re-order buffer (310) entry (312) is valid when the re-order buffer (310) entry (312) includes a pending instruction that has not been moved to the architected register file (306). When the re-order buffer (310) entry (312) is moved to the architected register file (306), the valid bit may be set to a value indicating that the re-order buffer (310) entry (312) is invalid.

The example method depicted in FIG. 5 also includes dismissing (512) the request (502) to read the entry (308) in the architected register file (306). In the example method depicted in FIG. 5, dismissing (512) the request (502) to read the entry (308) in the architected register file (306) is carried out in response to affirmatively (508) determining that the entry (312) in the re-order buffer (310) is designated as being valid. The example method depicted in FIG. 5 also includes servicing (514) the request (502) to read the entry (308) in the architected register file (306) in response to determining that the entry (312) in the re-order buffer (310) is not (510) designated as being valid. Readers will appreciate that when the entry (312) in the re-order buffer (310) is designated as being valid, the instruction identified in the entry (312) has not yet been committed and the entry (308) in the architected register file (306) does not yet need to be moved to the history buffer.

Figure 6:
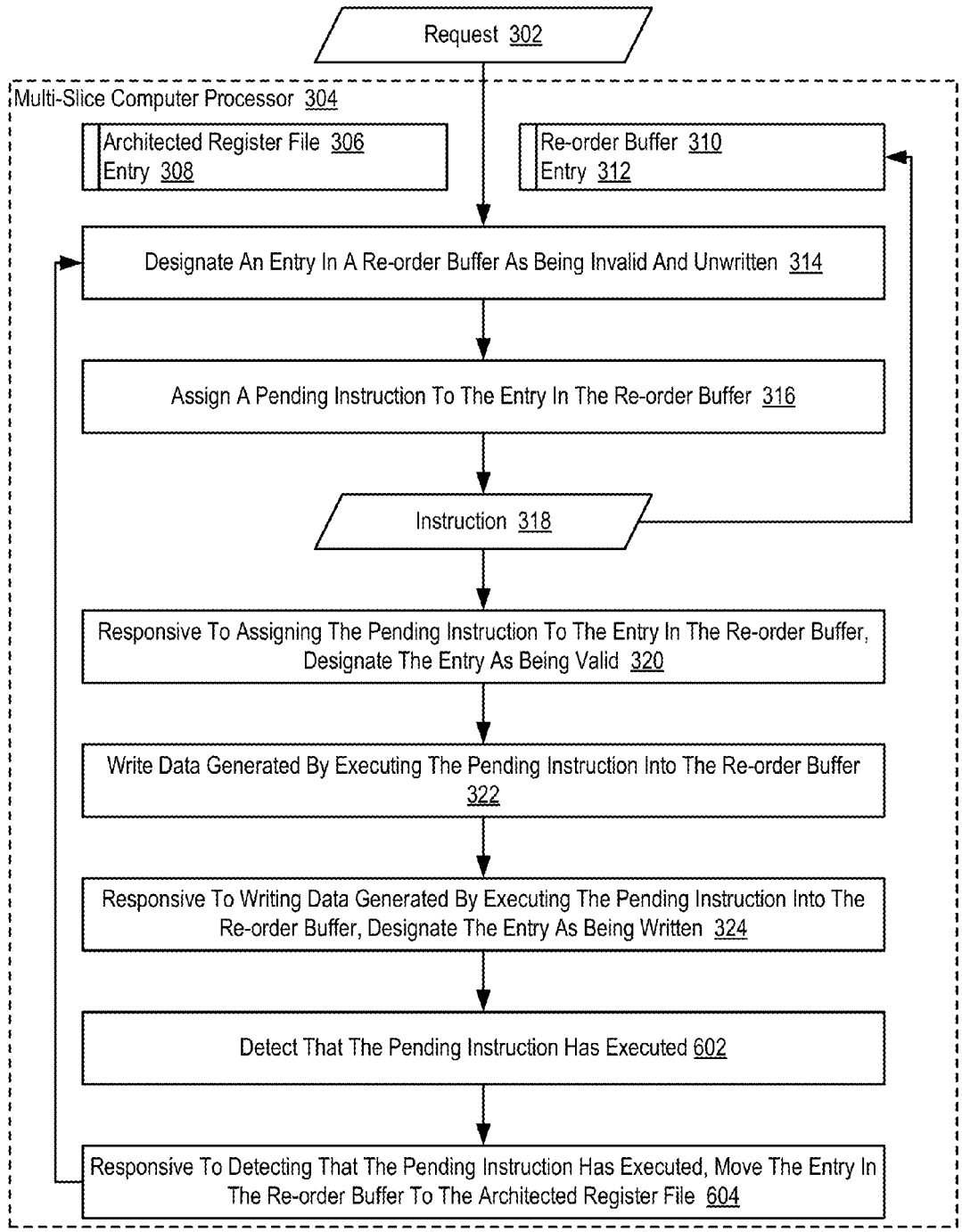
FIG. 6 sets forth a flow chart illustrating an additional example method for reducing power consumption in a multi-slice computer processor according to embodiments of the present disclosure.

For further explanation, FIG. 6 sets forth a flow chart illustrating an additional example method for reducing power consumption in a multi-slice computer processor (304) according to embodiments of the present disclosure. The example method depicted in FIG. 6 is similar to the example method depicted in FIG. 3, as the example method depicted in FIG. 6 also includes designating (314) an entry (312) in the re-order buffer (310) as being invalid and unwritten, assigning (316) a pending instruction (318) to the entry (312) in the re-order buffer (310), designating (320) the entry (312) as being valid, writing (322) data generated by executing the pending instruction into the entry (312) in the re-order buffer (310), and designating (324) the entry (312) as being written.

The example method depicted in FIG. 6 also includes detecting (602) that the pending instruction has executed. Detecting (602) that the pending instruction has executed may be carried out, for example, by determining that the re-order buffer (310) entry (312) that included the instruction has been designated as being written, by detecting that results for executing the instruction have been placed on the results bus, and so on. The example method depicted in FIG. 6 also includes, responsive (604) to detecting that the pending instruction has executed, moving the entry (312) in the re-order buffer (310) to the architected register file (306).

The example method depicted in FIG. 6 also includes, responsive to moving the entry (312) in the re-order buffer (310) to the architected register file (306), designating (314) the entry (312) in the re-order buffer (310) as being invalid and unwritten. Designating (314) the entry (312) in the re-order buffer (310) as being invalid and unwritten may be carried out, for example, by setting the valid bit and the written bit to the appropriate value. For example, the valid bit and the written bit may be set to values of 0, thereby freeing up the entry (312) in the re-order buffer (310) for use by another instruction.

Figure 7:
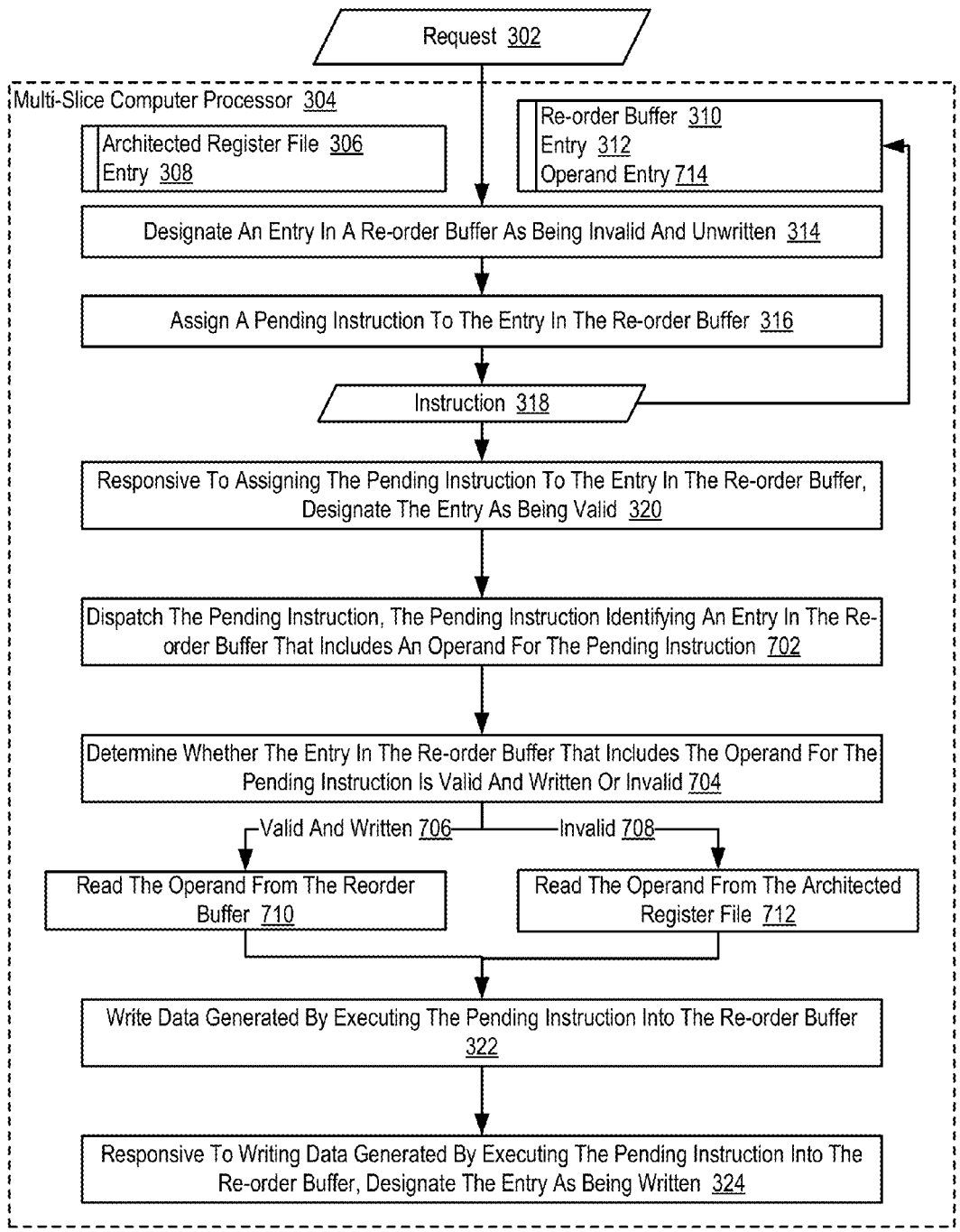
FIG. 7 sets forth a flow chart illustrating an additional example method for reducing power consumption in a multi-slice computer processor according to embodiments of the present disclosure.

For further explanation, FIG. 7 sets forth a flow chart illustrating an additional example method for reducing power consumption in a multi-slice computer processor (304) according to embodiments of the present disclosure. The example method depicted in FIG. 7 is similar to the example method depicted in FIG. 3, as the example method depicted in FIG. 7 also includes designating (314) an entry (312) in the re-order buffer (310) as being invalid and unwritten, assigning (316) a pending instruction (318) to the entry (312) in the re-order buffer (310), designating (320) the entry (312) as being valid, writing (322) data generated by executing the pending instruction into the entry (312) in the re-order buffer (310), and designating (324) the entry (312) as being written.

The example method depicted in FIG. 7 also includes dispatching (702) the pending instruction (318). In the example method depicted in FIG. 7, the pending instruction (318) can identify an entry (714) in the re-order buffer (310) that includes an operand for the pending instruction (318). Readers will appreciate that dispatching (702) the pending instruction (318) creates the need to obtain all operands utilized by the pending instruction (318). Because the re-order buffer (310) can serve a source of operands, the operands for the pending instruction (318) may be identified as residing within an entry (714) in the re-order buffer (310).

The example method depicted in FIG. 7 also includes determining (704) whether the entry (714) in the re-order buffer (310) that includes the operand for the pending instruction (318) is valid and written or invalid. Determining (704) whether the entry (714) in the re-order buffer (310) that includes the operand for the pending instruction (318) is valid and written or invalid may be carried out, for example, by reading the value of the valid bit and the written bit as described above.

The example method depicted in FIG. 7 also includes, responsive to determining that the entry (714) in the re-order buffer (310) that includes the operand for the pending instruction (318) is valid and written (706), reading (710) the operand from the reorder buffer (310). Readers will appreciate that when the entry (714) in the re-order buffer (310) that includes the operand for the pending instruction (318) is valid and written (706), the operand data has been written into the entry (714) in the re-order buffer (310) and has not yet been moved to the architected register file (306). As such, the operand data can be read from the entry (714) in the re-order buffer (310).

The example method depicted in FIG. 7 also includes, responsive to determining that the entry (714) in the re-order buffer (310) that includes the operand for the pending instruction (318) is invalid (708), reading the operand from the architected register file (306). Readers will appreciate that when the entry (714) in the re-order buffer (310) that includes the operand for the pending instruction (318) is invalid (706), the operand data has been moved to the architected register file (306). As such, the operand data can be read from the architected register file (306).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of reducing power consumption in a multi-slice computer processor, the multi-slice computer processor including a re-order buffer, the method comprising:
   assigning a pending instruction to an entry in the re-order buffer, wherein the entry was previously designated as being invalid;
   responsive to assigning the pending instruction to the entry in the re-order buffer, designating the entry as being valid;
   writing data generated by executing the pending instruction into the re-order buffer; and
   responsive to writing data generated by executing the pending instruction into the re-order buffer, designating the entry as being written.

2. The method of claim 1 further comprising:
   receiving a request to read the entry in the re-order buffer;
   determining whether the entry in the re-order buffer is designated as being valid and written;
   responsive to determining that the entry in the re-order buffer is designated as being valid and written, servicing the request to read the entry in the re-order buffer; and
   responsive to determining that the entry in the re-order buffer is not designated as being valid and written, dismissing the request to read the entry in the re-order buffer.

3. The method of claim 1, wherein the multi-slice processor further comprises an architected register file and the method further comprises:
   receiving a request to read an entry in the architected register file;
   determining whether the entry in the re-order buffer is designated as being valid;
   responsive to determining that the entry in the re-order buffer is designated as being valid, dismissing the request to read the entry in the architected register file; and
   responsive to determining that the entry in the re-order buffer is not designated as being valid, servicing the request to read the entry in the architected register file.

4. The method of claim 1, wherein the multi-slice processor further comprises an architected register file and the method further comprises:
   detecting that the pending instruction has executed; and
   responsive to detecting that the pending instruction has executed, moving the entry in the re-order buffer to the architected register file.

5. The method of claim 4 further comprising, responsive to moving the entry in the re-order buffer to the architected register file, designating the entry in the re-order buffer as being invalid and unwritten.

6. The method of claim 1, wherein the multi-slice processor further comprises an architected register file and the method further comprises:
   dispatching the pending instruction, the pending instruction identifying an entry in the re-order buffer that includes an operand for the pending instruction;
   determining whether the entry in the re-order buffer that includes the operand for the pending instruction is valid and written or invalid;
   responsive to determining that the entry in the re-order buffer that includes the operand for the pending instruction is valid and written, reading the operand from the reorder buffer; and
   responsive to determining that the entry in the re-order buffer that includes the operand for the pending instruction is invalid, reading the operand from the architected register file.

7. The method of claim 1 wherein each entry in the re-order buffer includes a valid bit and a reorder bit.

* * * * *